United States Patent
Mercer et al.

(10) Patent No.: US 11,149,996 B2
(45) Date of Patent: Oct. 19, 2021

(54) PRESSURE REDUCING VARIABLE EXPANSION DISC

(71) Applicant: CARRIER CORPORATION, Palm Beach Gardens, FL (US)

(72) Inventors: Kevin Mercer, Danville, IN (US); James Amick, Coatesville, IN (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 113 days.

(21) Appl. No.: 16/262,495

(22) Filed: Jan. 30, 2019

(65) Prior Publication Data

US 2019/0293327 A1    Sep. 26, 2019

Related U.S. Application Data

(60) Provisional application No. 62/647,354, filed on Mar. 23, 2018.

(51) Int. Cl.
| | | |
|---|---|---|
| *F25B 41/31* | (2021.01) | |
| *F25B 39/00* | (2006.01) | |
| *F25B 39/02* | (2006.01) | |

(52) U.S. Cl.
CPC ............. *F25B 41/31* (2021.01); *F25B 39/00* (2013.01); *F25B 39/02* (2013.01); *F25B 2600/2513* (2013.01)

(58) Field of Classification Search
CPC .......... F25B 41/06; F25B 2600/2513; F25B 41/062; F25B 39/02
See application file for complete search history.

(56) References Cited

U.S. PATENT DOCUMENTS

| | | |
|---|---|---|
| 5,417,083 A | 5/1995 | Eber |
| 5,826,438 A | 10/1998 | Ohishi et al. |

(Continued)

FOREIGN PATENT DOCUMENTS

| | | |
|---|---|---|
| CN | 106642787 A | 5/2017 |
| DE | 102008012705 B4 | 7/2012 |

(Continued)

OTHER PUBLICATIONS

Anonymous, "Electronic Expansion Valve R Series", URL:<https://www.sanhuausa.com/us/en/products/electronic-expansion-valves-customized/electronic-expansion-valve-r-series#general-specifications>, 6 pages.

(Continued)

*Primary Examiner* — David J Teitelbaum
(74) *Attorney, Agent, or Firm* — Cantor Colburn LLP

(57) ABSTRACT

A heat exchanger is provided and includes a header, a tubular element and an expansion disc assembly. The expansion disc assembly includes a disc body and an actuator. The disc body includes two or more leaves fluidly interposed between the tubular element and the header and configured to cooperatively assume a closed condition by a first shuttering action at which the disc body exclusively inhibits a flow of the fluid, a fully open condition by a second shuttering action at which the disc body permits the flow of the fluid and partial open conditions between the closed and full open conditions by third shuttering actions at which the disc body exclusively inhibits a portion of the flow of the fluid. The actuator is controllable to cause the disc body to execute the first, second and third shuttering actions to assume the closed, fully open and partial open conditions.

19 Claims, 3 Drawing Sheets

(56) References Cited

U.S. PATENT DOCUMENTS

| | | | |
|---|---|---|---|
| 6,481,229 | B1 | 11/2002 | Yajima et al. |
| 6,915,648 | B2 | 7/2005 | Wightman |
| 9,777,866 | B2 | 10/2017 | Deng |
| 10,295,100 | B1 * | 5/2019 | Handley ............... F16L 55/027 |
| 2007/0039724 | A1 * | 2/2007 | Trumbower .......... F28F 9/0273 |
| | | | 165/174 |
| 2009/0025416 | A1 * | 1/2009 | Murakami .............. F25B 41/04 |
| | | | 62/324.6 |
| 2012/0180518 | A1 | 7/2012 | Yukimoto |
| 2015/0362263 | A1 | 12/2015 | Wang et al. |
| 2016/0186616 | A1 | 6/2016 | Matsumoto et al. |
| 2017/0227266 | A1 | 8/2017 | Winters et al. |

FOREIGN PATENT DOCUMENTS

| | | |
|---|---|---|
| JP | 2006153141 A | 6/2006 |
| JP | 5786156 B2 | 9/2015 |

OTHER PUBLICATIONS

Semenic et al., "Evaporators for High Temperature Lift Vapor Compression Loop for Space Applications", URL:<https://www.1-act.com/wp-content/uploads/2013/01/ASME-Heat-Transfer-2009-Advanced-Evaporator-Design-for-High-Temperature-Lift-VSC-For-Space-Applications.pdf>, 7 pages.

* cited by examiner

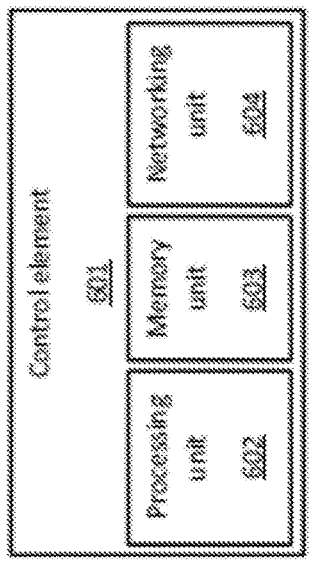
FIG. 5
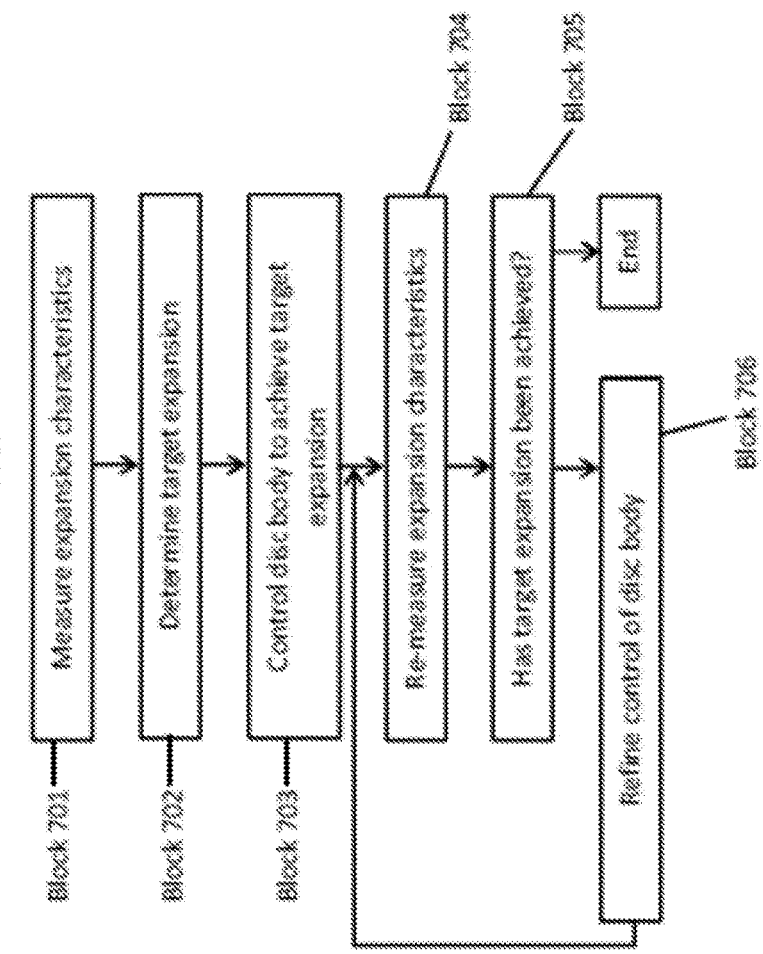
FIG. 6
FIG. 7

PRESSURE REDUCING VARIABLE EXPANSION DISC

CROSS-REFERENCE TO RELATED APPLICATIONS

This application claims the benefit of U.S. Provisional Application No. 62/647,354, filed Mar. 23, 2018, which is incorporated herein by reference in its entirety.

BACKGROUND

The following description relates to an expansion disc and, more specifically, to an electronically controllable, pressure reducing expansion disc.

Evaporators are heat exchangers in which a fluid, such as refrigerant, flows from one header body to another through a series of tubes or passes and thermally interacts with air or water flows between the tubes. The air or water flows between the tubes come into contact with fins that are arranged in contact with exterior surfaces of the tubes. Thus, heat is transferred from the fluid inside the tubes to the tubes, from the tubes to the fins and from the fins to the air or water flows between the tubes.

Microchannel evaporators are a type of evaporator in which the tubes or passes between the headers are made relatively small in diameter. Microchannel evaporators have been developed in response to needs for new heat exchanger technology and are often characterized as having a valve element, which is attached to an inlet header body and which includes an expander as well as feeder tubes. The expander serves to expand the fluid entering the inlet header body via the feeder tubes. This valve element and expander are typically arranged at an orthogonal angled with respect to the inlet header body and can provide the microchannel evaporator as a whole with a large profile.

BRIEF DESCRIPTION

According to an aspect of the disclosure, a heat exchanger is provided and includes a header, a tubular element to direct fluid toward the header and an expansion disc assembly. The expansion disc assembly includes a disc body and an actuator. The disc body includes two or more leaves fluidly interposed between the tubular element and the header and configured to cooperatively assume a closed condition by a first shuttering action at which the disc body exclusively inhibits a flow of the fluid, a fully open condition by a second shuttering action at which the disc body permits the flow of the fluid and partial open conditions between the closed and full open conditions by third shuttering actions at which the disc body exclusively inhibits a portion of the flow of the fluid. The actuator is controllable to cause the disc body to execute the first, second and third shuttering actions to thereby assume the closed, fully open and partial open conditions, respectively.

In accordance with additional or alternative embodiments, the header has a longitudinal axis and the tubular element extends along the longitudinal axis.

In accordance with additional or alternative embodiments, the tubular element and the disc body are concentric.

In accordance with additional or alternative embodiments, the expansion disc assembly includes a fitting which is attachable to or insertible into the header.

In accordance with additional or alternative embodiments, the disc body is rotatable between the closed, fully open and partial open conditions.

In accordance with additional or alternative embodiments, the disc body includes two or more rounded or angular leaves.

In accordance with additional or alternative embodiments, the disc body is formed to define an aperture when assuming the fully open and partial open conditions.

In accordance with additional or alternative embodiments, the aperture is one of annular and angular.

In accordance with additional or alternative embodiments, the actuator includes a rotary actuator configured to directly rotate the disc body.

In accordance with additional or alternative embodiments, the actuator includes a linear actuator configured to indirectly rotate the disc body.

In accordance with additional or alternative embodiments, the actuator is electronically controllable.

In accordance with additional or alternative embodiments, the expansion disc assembly includes a control element configured to control the actuator.

In accordance with additional or alternative embodiments, the heat exchanger is a microchannel heat exchanger.

According to another aspect of the disclosure, a heat exchanger is provided. The heat exchanger includes a header, a tubular element configured to direct a flow of fluid toward the header, at least one temperature sensor and an expansion disc assembly. The expansion disc assembly includes a disc body, an actuator and a control element. The disc body includes two or more leaves fluidly interposed between the tubular element and the header and configured such that the two or more leaves cooperatively assume a closed condition by a first shuttering action at which the disc body exclusively inhibits the flow, a fully open condition by a second shuttering action at which the disc body permits the flow and partial open conditions between the closed and full open conditions by third shuttering actions at which the disc body exclusively inhibits a portion of the flow. The actuator is controllable to cause the disc body to assume the closed, fully open and partial open conditions. The control element is configured to control the actuator based on readings generated by the at least one temperature sensor.

In accordance with additional or alternative embodiments, the control element is configured to control the actuator to achieve a target expansion of the flow of fluid.

In accordance with additional or alternative embodiments, the tubular element and the disc body are concentric.

In accordance with additional or alternative embodiments, the expansion disc assembly includes a fitting which is attachable to the header or is insertible into the header.

In accordance with additional or alternative embodiments, the actuator is electronically controllable.

According to yet another aspect of the disclosure, a method of operating a heat exchanger is provided. The method includes fluidly interposing a disc body between a tubular element and a header, the disc body including two or more leaves fluidly interposed between the tubular element and the header and being configured such that the two or more leaves cooperatively assume a closed condition by a first shuttering action at which the disc body exclusively inhibits a flow of fluid from the tubular element to the header, a fully open condition by a second shuttering action at which the disc body permits the flow and partial open conditions between the closed and full open conditions by third shuttering actions at which the disc body exclusively inhibits a portion of the flow and controlling the disc body to assume the closed, fully open and partial open conditions to achieve a target expansion of the flow of fluid.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

FIG. 5 is a side view of a microchannel heat exchanger in accordance with alternative embodiments;

FIG. 6 is a schematic diagram of a control element of a microchannel heat exchanger in accordance with embodiments; and FIG. 7 is a flow diagram of a method of operating a microchannel heat exchanger in accordance with embodiments.

These and other advantages and features will become more apparent from the following description taken in conjunction with the drawings.

DETAILED DESCRIPTION

As will be described below, a microchannel heat exchanger is provided in which fluid, such as refrigerant, is expanded from high to low pressure in order to best utilize microchannel technology from a cost, design and manufacturing-friendly point of view. The microchannel heat exchanger includes a circular-shaped device that forms an opening of a certain geometry and to provide for fine flow control from a closed position to a maximum open position. The circular-shaped device is concentric with an inlet header body and is operable by a driving of internal rotating plates via an electric stepper motor or by another suitable mechanical or electro-mechanical apparatus. The circular-shaped device could be fit into the inlet header body of a microchannel heat exchanger evaporator or may be provided as part of a fitting that could be screwed into the inlet header body.

Figure 1:
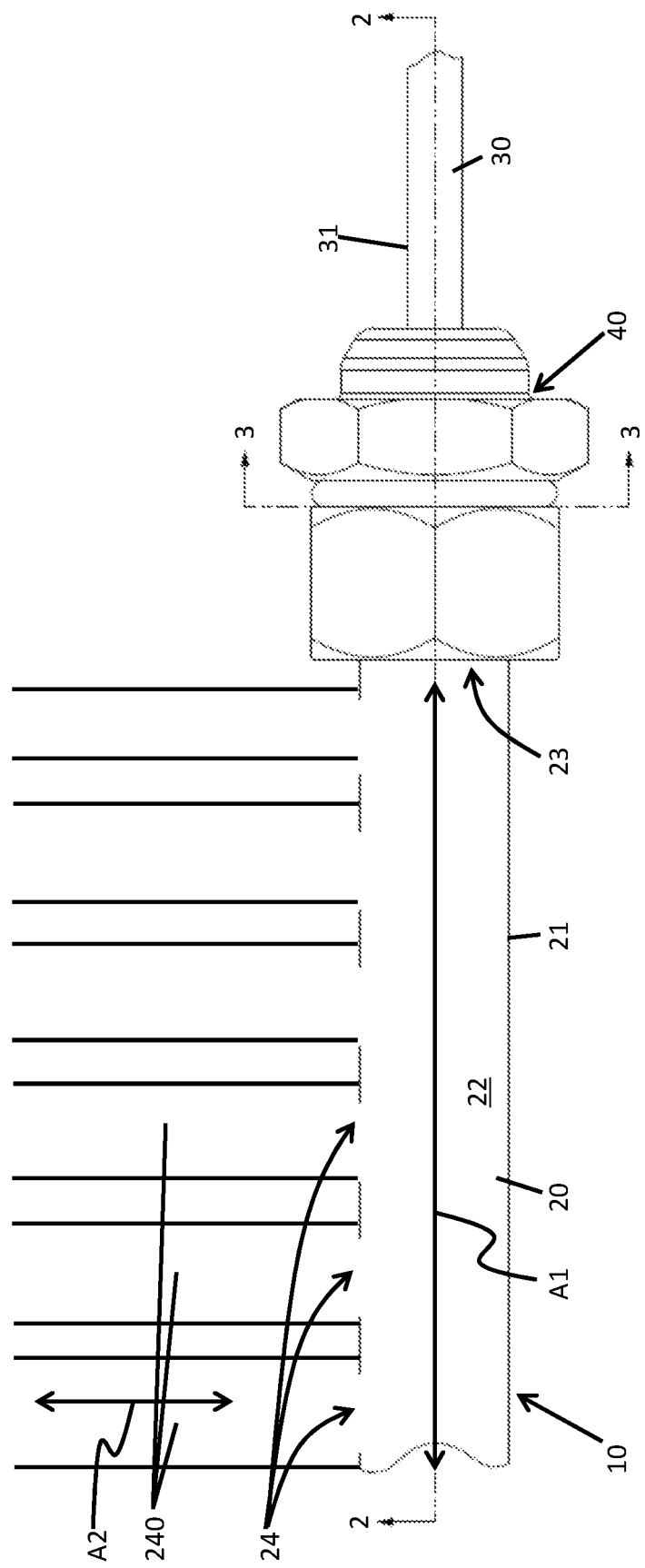
FIG. 1 is a side view of a microchannel heat exchanger in accordance with embodiments.
Figure 2:
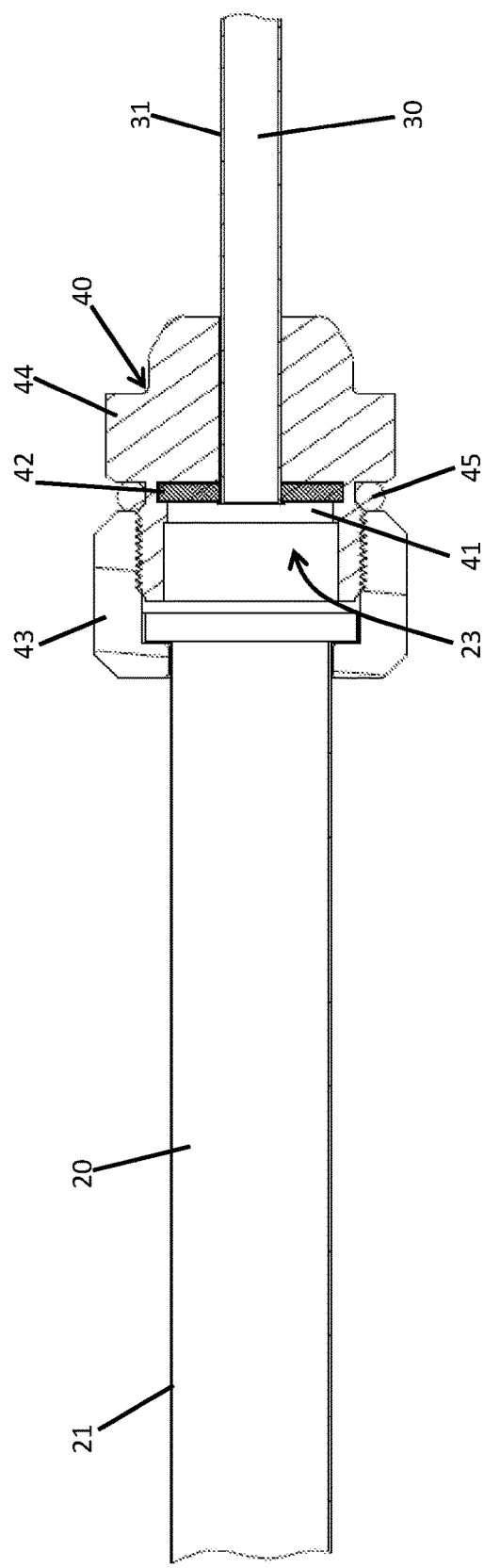
FIG. 2 is a side cutaway view of a portion of the microchannel heat exchanger of FIG. 1 taken along lines 2-2 of FIG. 1.

With reference to FIGS. 1 and 2, a microchannel heat exchanger 10 is provided. The microchannel heat exchanger 10 includes a header 20, a tubular element 30 and an expansion disc assembly 40.

The header 20 includes a header body 21 that is formed to define an interior 22 and extends along a longitudinal axis A1. The header 20 further includes an inlet 23 and outlets 24. The inlet 23 is formed by the header body 21 at a longitudinal end thereof and permits fluid flow into the interior 22. The outlets 24 are formed by the header body 21 and are arranged along the longitudinal axis A1 downstream from the inlet 23. Microchannel tubular bodies 240 extend away from the header body 21 along respective axes A2. The respective axes A2 of the microchannel tubular bodies 240 are oriented to extend transversely with respect to the longitudinal axis A1 of the header body 21.

The tubular element 30 is configured to direct a flow of fluid toward the inlet 23 of the header body 21. The tubular element 30 may include or be provided as a flow line 31.

As shown in FIG. 2, the expansion disc assembly 40 includes a disc body 41, which is fluidly interposed between the tubular element 30 and the header body 21, and an actuator 42. In accordance with embodiments, the tubular element 30 may extend along and in parallel with the longitudinal axis A1. In accordance with further embodiments, the header body 21, the tubular element 30 and the disc body 41 may be concentric.

Figure 4:
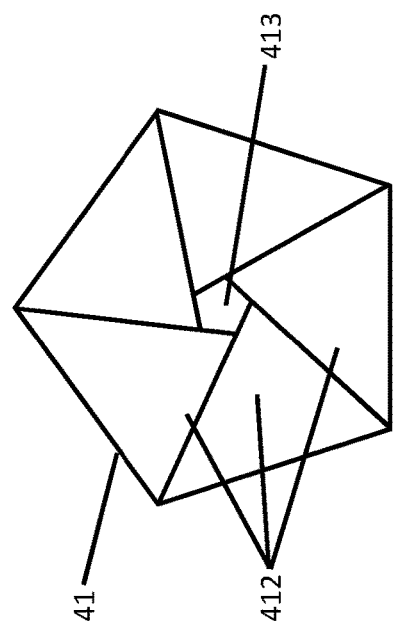
FIG. 4 is an axial view of a disc body of an expansion disc assembly of the microchannel heat exchanger of FIGS. 1 and 2 in accordance with alternative embodiments.
Figure 3:
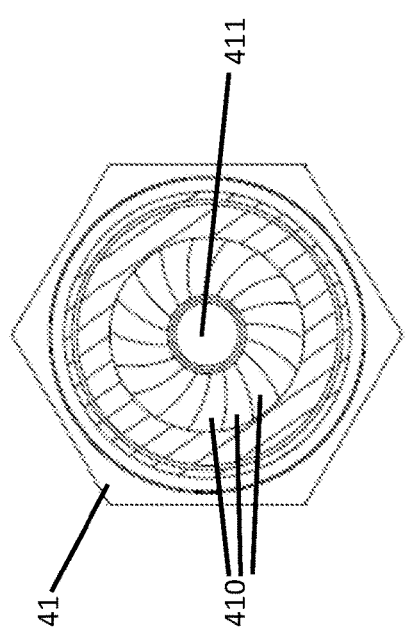
FIG. 3 is an axial view of a disc body of an expansion disc assembly of the microchannel heat exchanger of FIGS. 1 and 2 taken along lines 3-3 of FIG. 1.

With continued reference to FIGS. 1 and 2 and with additional reference to FIGS. 3 and 4, the disc body 41 is configured to assume a closed condition by a first shuttering action at which fluid flow from the tubular element 30 and through the inlet 23 is exclusively prevented or exclusively inhibited by the disc body 41, a fully open condition by a second shuttering action at which the fluid flow from the tubular element 30 and through the inlet 23 is fully maximized or permitted by the disc body 41 and partial open conditions by third shuttering actions. The partial open conditions are defined between the closed and full open conditions and are characterized in that the disc body 41 exclusively permits partial fluid flows from the tubular element 30 and through the inlet 23. The actuator 42 is controllable to cause the disc body 41 to assume any one of the closed, fully open and partial open conditions at any given time based on various factors.

The disc body 41 may include two or more rounded or angular leaves. For example, as shown in FIG. 3, the disc body 41 may include first and second or multiple curved leaves 410 which are cooperatively formed to assume the closed condition at a first rotational or translational position and which are cooperatively formed to define a partially or fully annular or angular aperture 411 of various areas at various second rotational or translational positions when assuming the full open and partial open conditions. As another example, as shown in FIG. 4, the disc body 41 may include multiple angular leaves 412 which are cooperatively formed to assume the closed condition at a first rotational or translational position and which are cooperatively formed to define a partially or fully angular or annular aperture 413 of various areas at various second rotational or translational positions when assuming the full open and partial open conditions.

In accordance with embodiments, the disc body 41 may be configured to be rotatable between the closed, fully open and partial open conditions. In these cases, where the disc body 41 includes the first and second curved leaves 410 of FIG. 3, the first and second curved leaves 410 assume the closed condition at a first rotational position (i.e., the first shuttering action) and define the partially or fully annular or angular aperture 411 of various areas at the various second rotational positions. Where the disc body 41 includes the multiple angular leaves 412 of FIG. 4, the multiple angular leaves 412 assume the closed condition at a first rotational position (i.e., the first shuttering action) and define the partially or fully angular or annular aperture 413 at the various second rotational positions.

As used herein, it is to be understood that the first, second and third shuttering actions are characterized in that the one or more rounded or angular leaves (e.g., the multiple curved leaves 410 or the multiple angular leaves 412) rotate in concert with one another and create seals with adjacent leaves. These seals extend, at least in part, along complementary edges of the adjacent leaves and increase or decrease in length in accordance with a degree of the shuttering action. For example, the first shuttering action results in seals between complementary edges of adjacent leaves which extend from an outer diameter to at least the central axis of the disc body 41 whereas the second shuttering action results in seals of minimal length.

For the cases in which the disc body 41 is rotatable, the actuator 42 may include or be provided as an electronically controllable, rotary or linear actuator 420 that includes a stator and a winding, which is wound on the stator and receptive of current that generates a magnetic flux which directly or indirectly causes rotations of the disc body 41.

The expansion disc assembly 40 may include a first fitting part 43, which is attachable to the header 20 proximate to the inlet 23, a second fitting part 44, which is configured to threadably engage with the first fitting part 43 in a tightening direction about the disc body 41 and the actuator 42, and a seal 45 to seal an interface between the first and second fitting parts 43 and 44. The tubular element 30 extends through the second fitting part 44 and the actuator 42 and terminates at or near to the disc body 41. Thus, fluid moving through the tubular element 30 toward the interior 22 passes through the disc body 41 prior to passing through the inlet 23 and is expanded by a degree which corresponds to the degree the discus body 41 is opened or closed.

With reference to FIG. 5 and, in accordance with alternative embodiments, the expansion disc assembly 40 may be inserted into the header 20 or the tubular element 30. For example, as shown in FIG. 5, the disc body 41 and the actuator 42 of the expansion disc assembly 40 may be installed adjacent to an end wall 230 of the header 20, which is formed to define the inlet 23. In this case, the tubular element 30 terminates at the inlet 23. Thus, in this case, fluid moving through the tubular element 30 toward the interior 22 passes through the inlet 23 prior to passing through the disc body 41 and, again, is expanded by a degree which corresponds to the degree the discus body 41 is opened or closed.

With reference to FIGS. 6 and 7, the expansion disc assembly 40 may also include a control element 601 that is configured to control the actuator 42.

As shown in FIG. 6, the control element 601 may include a processing unit 602, a memory unit 603 and a networking unit 604 by which the processing unit 602 can exert control over the actuator 42. The memory unit 603 has executable instructions stored thereon which are readable and executable by the processing unit 602. When the executable instructions are read and executed by the processing unit 602, the executable instructions cause the processing unit 602 to operate as described herein.

For example, as shown in FIG. 7, a method of operating an expansion disc assembly 40 is provided where the disc body 41 is fluidly interposed between the tubular element 30 and the inlet 23, as described above, and where the disc body 41 is configured to assume a closed condition, a fully open condition and partial open conditions between the closed and full open conditions. Here, the executable instructions, when read and executed by the processing unit 602, may cause the processing unit 602 to measure expansion characteristics of fluid flows upstream and downstream from the disc body 41 (block 701), to determine a target expansion of a flow of fluid from the tubular element 30 and through the inlet 23 (block 702) and to control the disc body 41 to assume the closed, fully open and partial open conditions in order to achieve the target expansion (block 703). The executable instruction may further cause the processing unit 602 to re-measure the expansion characteristics (block 704), to determine whether the target expansion has been achieved (block 705) and to refine the control of the disc body 41 to an extent that the target expansion has not been achieved (block 706).

Benefits of the features described herein are the provision of a simple and inexpensive component that could replace other more complex and expensive components. The component would be located in an ideal location for achieving optimized two-phase liquid distribution and has robust properties relative to a gravitational field (i.e., in horizontal or vertical coil orientations).

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A heat exchanger, comprising:
a header;
a tubular element to direct fluid toward the header; and
an expansion disc assembly, comprising:
a disc body comprising two or more leaves fluidly interposed between the tubular element and the header and configured such that the two or more leaves cooperatively assume a closed condition by a first shuttering action at which the disc body exclusively inhibits a flow of the fluid, a fully open condition by a second shuttering action at which the disc body permits the flow of the fluid and partial open conditions between the closed and full open conditions by third shuttering actions at which the disc body exclusively inhibits a portion of the flow of the fluid;
an actuator, which is controllable to cause the disc body to execute the first, second and third shuttering actions to thereby assume the closed, fully open and partial open conditions, respectively,
wherein:
the expansion disc assembly is adjacent to the end wall and the actuator is adjacent to the disc body, and
the header has a longitudinal axis and comprises an end wall formed to define an inlet and a header body formed to define an interior, the tubular element extends along the longitudinal axis, through the actuator and terminates at the disc body such that the tubular element is fluidly coupled to the end wall to direct fluid through the inlet of the end wall and toward the interior of the header body.

2. The heat exchanger according to claim 1, wherein the tubular element and the disc body are concentric.

3. The heat exchanger according to claim 1, wherein the expansion disc assembly comprises a fitting which is attachable to or insertible into the header.

4. The heat exchanger according to claim 1, wherein the disc body is rotatable between the closed, fully open and partial open conditions.

5. The heat exchanger according to claim 4, wherein the disc body comprises two or more rounded or angular leaves.

6. The heat exchanger according to claim 4, wherein the disc body is formed to define an aperture when assuming the fully open and partial open conditions.

7. The heat exchanger according to claim 6, wherein the aperture is one of annular and angular.

8. The heat exchanger according to claim 4, wherein the actuator comprises a rotary actuator configured to directly rotate the disc body.

9. The heat exchanger according to claim 4, wherein the actuator comprises a linear actuator configured to indirectly rotate the disc body.

10. The heat exchanger according to claim 1, wherein the actuator is electronically controllable.

11. The heat exchanger according to claim 1, wherein the expansion disc assembly comprises a control element configured to control the actuator.

12. The heat exchanger according to claim 1, wherein the heat exchanger is a microchannel heat exchanger.

13. A heat exchanger, comprising:
a header;
a tubular element configured to direct a flow of fluid toward the header;
at least one temperature sensor; and
an expansion disc assembly, comprising:
a disc body comprising two or more leaves fluidly interposed between the tubular element and the header and configured such that the two or more leaves cooperatively assume a closed condition by a first shuttering action at which the disc body exclusively inhibits the flow, a fully open condition by a second shuttering action at which the disc body permits the flow and partial open conditions between the closed and full open conditions by third shuttering actions at which the disc body exclusively inhibits a portion of the flow;
an actuator, which is controllable to cause the disc body to assume the closed, fully open and partial open conditions; and
a control element configured to control the actuator based on readings generated by the at least one temperature sensor,
wherein:
the expansion disc assembly is adjacent to the end wall and the actuator is adjacent to an upstream side of the disc body, and
the header has a longitudinal axis and comprises an end wall formed to define an inlet and a header body formed to define an interior, the tubular element extends along the longitudinal axis, through the actuator and terminates at the upstream side of the disc body such that the tubular element is fluidly coupled to the end wall to direct fluid through the inlet of the end wall and toward the interior of the header body.

14. The heat exchanger according to claim 13, wherein the control element is configured to control the actuator to achieve a target expansion of the flow of fluid.

15. The heat exchanger according to claim 13, wherein the tubular element and the disc body are concentric.

16. The heat exchanger according to claim 13, wherein the expansion disc assembly comprises a fitting which is attachable to the header or is insertible into the header.

17. The heat exchanger according to claim 13, wherein the actuator is electronically controllable.

18. The heat exchanger according to claim 13, wherein the heat exchanger is a microchannel heat exchanger.

19. A method of operating a heat exchanger, comprising:
fluidly interposing a disc body between a tubular element and a header,
the disc body comprising two or more leaves fluidly interposed between the tubular element and the header and being configured such that the two or more leaves cooperatively assume a closed condition by a first shuttering action at which the disc body exclusively inhibits a flow of fluid from the tubular element to the header, a fully open condition by a second shuttering action at which the disc body permits the flow and partial open conditions between the closed and full open conditions by third shuttering actions at which the disc body exclusively inhibits a portion of the flow; and
controlling the disc body to assume the closed, fully open and partial open conditions to achieve a target expansion of the flow of fluid,
wherein:
the expansion disc assembly is adjacent to the end wall and the actuator is adjacent to an upstream side of the disc body, and
the header has a longitudinal axis and comprises an end wall formed to define an inlet and a header body formed to define an interior, the tubular element extends along the longitudinal axis, through the actuator and terminates at the upstream side of the disc body such that the tubular element is fluidly coupled to the end wall to direct fluid through the inlet of the end wall and toward the interior of the header body.

* * * * *